3,609,871
GAS PURIFICATION AND GETTER REGENERATION APPARATUS AND METHOD
John M. Ellison, 4907 Ethyl Ave.,
Sherman Oaks, Calif. 91403
Filed Feb. 27, 1970, Ser. No. 15,137
Int. Cl. F26b 7/00, 19/00
U.S. Cl. 34—13                                14 Claims

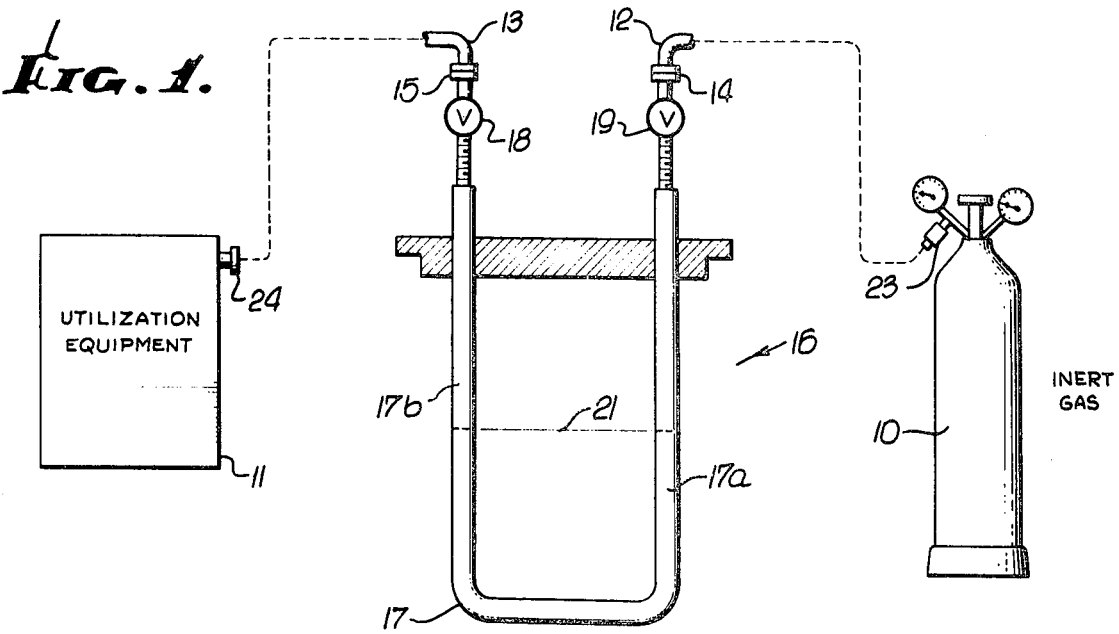
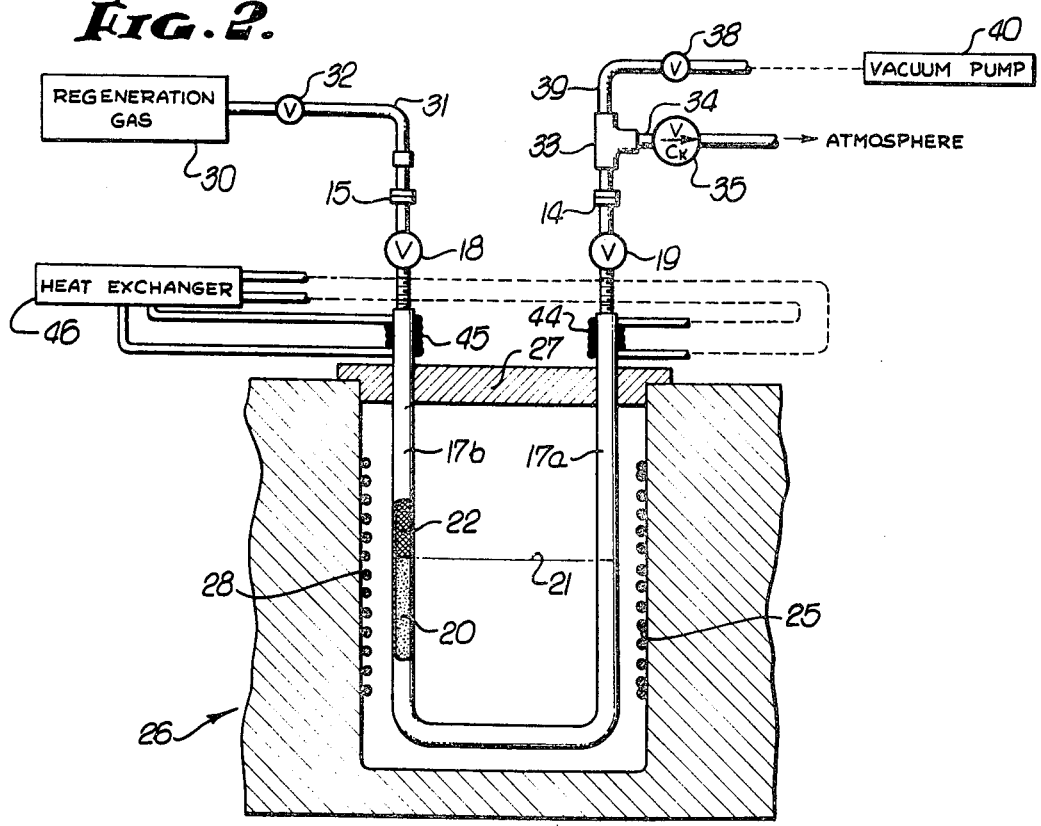

ABSTRACT OF THE DISCLOSURE

Regeneration of a gas purifier comprising a bed containing an oxygen contaminated getter and a molecular sieve includes the steps of heating the bed containing the getter by means other than the purge gas; flowing through the bed a gaseous mixture of an inert gas and hydrogen characterized in that hydrogen and oxygen contaminant in the getter react to produce water or moisture that is purged; removing residual water from the sieve by subjecting the bed to evacuation; and supplying an inert fill gas to the bed for cooling same.

BACKGROUND OF THE INVENTION

This invention relates generally to gas purification, and more particularly concerns apparatus and method for removing trace contaminants from inert gas streams.

In the past, where high purity inert gases were required by utilization apparatus, it has been the practice for users to obtain the required high purity gas (say, less than 1 p.p.m. impurity) in containers at relatively high expense. Alternatively, it was possible to purchase commercial grade inert gas at lesser expense and subject it to purification; however, this expedient has in certain cases been found less than satisfactory, as for example in instances where trace oxygen had to be removed from inert gas (such as argon, helium or nitrogen) by means of a getter. One problem that has been encountered has been that of regeneration of the oxygen getter after contamination, it having been thought necessary to pass hot hydrogen containing purge gas to the getter in order that the hydrogen and oxygen might combine to produce removable water. Since the purge gas must heat up the getter bed and the concentration of hydrogen in the inert purge gas was necessarily low, for safety, an uneconomic wastage of through-put purge gas resulted. In addition, the getter in its container was oftentimes subject to unavoidable oxygen contamination when the container was removed from auxiliary purge equipment for connection with inert gas utilization apparatus, for on-stream use. No simple, reliable process and apparatus were known to eliminate these as well as other problems encountered when purification of commercial grade inert gas was elected.

SUMMARY OF THE INVENTION

It is a major object of the invention to provide solutions to the above mentioned problems and difficulties. Basically, and in its process aspects, the invention embodies the steps that includes first heating the bed containing the getter by means other than the purge gas; flowing through the bed a gaseous mixture of an inert gas and hydrogen characterized in that the hydrogen and oxygen contaminant in the getter react to produce water or moisture that is purged; removing residual water from the sieve by subjecting the bed to evacuation; and supplying an inert fill gas to the bed for cooling same. As will be seen, the heat transfer may be accomplished by placing the bed (which may be U-shaped) in an oven, thereby to heat the getter and sieve to a temperature of between about 500° to 600° F., prior to introducing hydrogen containing purge gas to the bed so as to eliminate wastage of the purge gas. Also, the duct end terminals may be closable as by valving at the completion of supply of inert fill gas into the bed after purging and evacuation, and the valving and end terminals may be maintained at reduced temperature during the heat transfer step, so as not to degrade the valving.

In its apparatus aspects, the invention basically comprises a bed (which may be confined by a tube) containing a molecular sieve and a trace gas getter (as for example an oxygen getter) subject to contamination in response to flow therethrough of inert gas containing trace gas, there being means at opposite ends of the duct for sealing off the gas flow, such means including valving operable in response to connection thereto of inert gas inlet and outlet piping and closable in response to disconnection therefrom of such piping. The bed may be U-shaped with legs or branches each of which contains the getter and sieve material, the latter preferably but not necessarily extending between the getter and the duct ends in order to block entrainment of getter particles in the gas stream leaving the duct. In this regard, the getter and sieve are both porous.

Additional objects and advantages of the invention include the provision of an inert gas container connected via the inlet piping with the valving at one end of the duct, and an inert gas utilization device connected via the outlet piping with the valving at the opposite end of the duct; and the provision of a heater (for example an oven) to which the bed legs are exposed, there being a purge gas container connected via a first section of the piping with the valving at one end of the bed, and there being evacuation and discharge controls connected via a second section of the piping with the valving at the opposite end of the duct. In this regard, the purge gas may contain hydrogen for reaction with oxygen contaminating the getter, as referred to.

These and other objects and advantages of the invention, as well as the details of an illustrative embodiment, will be more fully understood from the following detailed description of the drawings, in which:

BRIEF DESCRIPTION OF THE DRAWINGS

FIG. 1 is an elevation showing use of the gas purification apparatus; and

FIG. 2 is an elevation showing the FIG. 1 apparatus connected and located for getter regeneration.

DESCRIPTION OF PREFERRED EMBODIMENT

Referring first to FIG. 1, a source of inert gas as for example helium, argon, nitrogen or other, is shown at 10 in the form of a commercial container for pressurized gas. The inert gas may for example be intended for use with equipment 11, one example being a gas chromatograph; however, it is first necessary to purify the commercial grade gas to remove small or trace amounts of oxygen and water contaminant. For this purpose, the tubing or lines 12 and 13 respectively connected with container 10 and equipment 11 are connected with the end couplings 14 and 15 associated with the gas purification apparatus 16.

The latter comprises an elongated walled duct, which may advantageously form a U-tube having branches 17a and 17b. The upper terminals of the latter communicate with couplings 14 and 15 via manually controlled valves 18 and 19. If manually controlled valves 18 and 19 are not used, fittings 14 and 15 may advantageously comprises quick-disconnect self sealing fittings charatcerized in that the terminals of lines 12 and 13 may be pushed into the couplings resulting in sealing connection of the couplings to the line terminals, automatically, such couplings being known devices, one being the Series 8000 product of the Hansen Manufacturing Company, Cleveland, Ohio.

Followig such connection, the valves 18 and 19 are opened, with resultant flow of inert gas from container 10 through the oxygen removal apparatus 16 to the equipment 11. For this purpose, and in accordance with the invention, an oxygen getter 20, as for example the Dow Chemical product known as Q-1, may be contained in the lower portion of the U-tube 17, filling same to the level 21 in the branches 17a and 17b. The powdery form getter may be physically retained in the lower portions of the branches by molecular sieve material packed into the upper portions of both branches as better indicated at 22 in FIG. 2. The getter and sieve may be considered to define a bed.

After contamination of the getter, as for example may be considered to occur when the oxygen content of the inert gas passed through apparatus 16 has risen to unacceptable level, the valves 18 and 19 are closed, or the quick-disconnect fittings are released, and line terminals 12 and 13 are removed from couplings 14 and 15. Valves 23 and 24 at elements 10 and 11 are also closed (or in the case of quick-disconnect fitting use, are not required). The apparatus 16 is then shifted to a station as indicated in FIG. 2, where the U-tube is received in a recess 25 formed by the oven 26. A cap 27 supporting the U-tube fits on the oven to close the recess 25, and suitable heater means, as for example electrical coil 28, is operated in the oven to elevate the temperatures of the duct branches 17a and 17b, the getter 20 and sieve 22 above 500° F., and typically to around 600° F. For this purpose, the oven may be pre-heated. Note that the getter is fully within the oven.

When the getter temperature reaches a level between about 500° to 600° F., a gaseous mixture of inert gas and hydrogn is caused to flow through the duct, the mixture being characterized in that the hydrogen is heated as it flows through the sieve in branch 17b and reacts with the oxygen in the heated getter to form water. The regeneration gas may for example consist of 90% nitrogen and 10% hydrogen stored in a container 30, a line 31 connecting the container with the coupling 15 via valve 32. The effluent regeneration gas passes to atmosphere via a T fitting 33 connected to coupling 14, leg 34 of the T and a check valve 35. (33, 14, 34 and 35 may or may not be used.)

Protection of non-metallic seals associated with the valves 18 and 19 and coupling 14 and 15 from high temperature degradation is afforded by heat removal from the upper ends of the branches 17a and 17b. For this purpose, means for dissipating the heat, as for example cooling coils 44 and 45, may closely surround those branch upper terminals as shown, refrigerant being supplied to the coils from heat exchanger 46.

It is found that heating of the getter as described, results in regeneration of the getter with minimum regeneration gas flow therethrough, i.e. unused hydrogen in the regeneration gas flow through the getter is reduced to a minimum, affording substantial savings in regeneration gas expenditure. Also, the regeneration time is significantly reduced, as compared with the time taken when an oven is not used, as described, and the regeneration gas itself is pre-heated.

After the getter is regenerated, the duct 17 is subjected to evacuation, in order to regenerate, i.e. purge collected residual water from, the molecular sieve material. This step may advantageously be accomplished by closing valve 18, opening valve 38 in line 39 leading from T 33 to a vacuum pump 40, and operating that pump, check valve 35 being closed. After a suitable time interval sufficient to assure desired extent of water removal from the sieve, the valves 19 and 38 are closed and pump 40 shut down. Thereafter, inert fill gas is supplied to the evacuated tube 17 by opening valve 18 to shorten the cool down time before transfer to the FIG. 1 station and connection to the gas source 10 and equipment 11.

Finally, valve 18 is closed, line 31 and T 33 are withdrawn from the couplings 15 and 14, and the tubing is removed from the oven 26 and returned to the FIG. 1 station for hook-up as described.

An example of a usable molecular sieve material is that known commercially as 13–X, a product of the Linde Co., Division of Union Carbide Corp.

I claim:

1. The process of regenerating a gas purifier comprising a bed containing an oxygen contaminated getter and a molecular sieve, that includes:
   (a) heating the bed to elevate the temperature of said getter and sieve in the bed,
   (b) flowing through the bed a gaseous mixture of an inert gas and hydrogen characterized in that the hydrogen and oxygen contaminant react to produce water that is purged,
   (c) removing residual water from the sieve by subjecting the bed to evacuation, and
   (d) supplying an inert fill gas to the bed, thereby to cool the bed.

2. The process of claim 1 wherein said heat transfer is accompanied by exposing the bed to a heater, thereby to heat the getter and sieve to a temperature between about 500° F. and 600° F.

3. The process of claim 1 wherein said gaseous mixture is caused to flow in sequence through a first portion of said sieve, said getter and then a second portion of said sieve.

4. The process of claim 1 wherein the bed has end terminals, and including the steps of maintaining said terminals at reduced temperature during said heat transfer, and closing said end terminals after said inert fill gas supply to the duct interior.

5. The process of claim 1 wherein said getter and sieve are heated to a temperature in excess of 500° F. prior to said gaseous mixture flow therethrough.

6. The process of claim 1 wherein the bed has end terminals, and including the step of sealing off said end terminals following said fill gas supplying step.

7. Gas purifier apparatus, comprising a bed containing molecular sieve and a trace oxygen getter subject to contamination in response to flow therethrough of inert gas containing trace gas, there being means at opposite ends of the bed for sealing off gas flow therethrough, said means including valving openable in response to connection thereto of inert gas inlet and outlet piping and closable in response to disconnection therefrom of said piping.

8. The apparatus of claim 7 wherein said bed is U-shaped.

9. The apparatus of claim 8 wherein said U-shaped bed has branches each of which contains said getter and said sieve.

10. The apparatus of claim 9 wherein said sieve is between said getter and each end of the bed.

11. The apparatus of claim 7 including an inert gas container connected via said inlet piping with said valving at one end of the bed, and an inert gas utilization device connected via said outlet piping with said valving at the other end of the bed.

12. The apparatus of claim 9 including a heater to which the bed branches are exposed, there being a purge gas container connected via a first section of said piping with said valving at one end of the bed, and there being evacuation and discharge controls connected via a second section of said piping with said valving at the other end of the bed.

13. The apparatus of claim 12 including means at opposite ends of the bed for maintaining said valving at said ends at reduced temperature in relation to the heater temperature.

14. The apparatus of claim 12 wherein said purge gas consists of an inert gas containing hydrogen to react with oxygen at the getter and produce water.

References Cited

UNITED STATES PATENTS

| 2,203,144 | 6/1940 | Hammond | 34—80 UX |
| 2,434,419 | 1/1948 | Laughlin et al. | 34—80 X |

CHARLES J. MYHRE, Primary Examiner

U.S. Cl. X.R.

34—80